United States Patent [19]

Kong

[11] Patent Number: 5,367,526
[45] Date of Patent: Nov. 22, 1994

[54] MEMORY MODULE, PARITY BIT EMULATOR, AND ASSOCIATED METHOD FOR PARITY BIT EMULATION

[76] Inventor: Edmund Y. Kong, 3590 Finch Pl., Fremont, Calif. 94555

[21] Appl. No.: 80,699
[22] Filed: Jun. 22, 1993
[51] Int. Cl.$^5$ ..................... G06F 11/10; H03M 13/00
[52] U.S. Cl. ................... 371/51.1; 371/49.2; 371/49.3
[58] Field of Search ............. 371/51.1, 49.1, 49.2, 371/49.3, 49.4, 40.4

[56] References Cited

U.S. PATENT DOCUMENTS

| | | | |
|---|---|---|---|
| 3,693,152 | 9/1972 | Hong | 340/146.1 |
| 3,992,696 | 11/1976 | Fergeson | 340/146.1 |
| 4,271,521 | 6/1981 | Mahmood | 371/51 |
| 4,433,388 | 2/1984 | Osterbaan | 364/900 |
| 4,472,805 | 9/1984 | Wacyk | 371/51 |
| 4,561,095 | 12/1985 | Kham | 371/38 |
| 4,656,605 | 4/1987 | Clayton | 365/52 |
| 4,706,249 | 11/1987 | Nakagawa et al. | 371/38 |
| 4,740,971 | 4/1988 | Tam et al. | 371/21 |
| 4,754,457 | 6/1988 | Bright | 371/47 |
| 4,809,278 | 2/1989 | Kim et al. | 371/51 |
| 4,831,625 | 5/1989 | Chiu | 371/51 |
| 4,884,270 | 11/1989 | Chiu | 371/21.2 |
| 4,928,281 | 5/1990 | Kurosawa et al. | 371/51.1 |
| 5,040,179 | 8/1991 | Chen | 371/37.1 |
| 5,056,095 | 10/1991 | Horiguchi | 371/40.4 X |
| 5,088,092 | 2/1992 | Jeppesen, III | 371/49.3 |
| 5,117,428 | 5/1992 | Jeppesen et al. | 371/51.1 |

Primary Examiner—Charles E. Atkinson
Assistant Examiner—Glenn Snyder
Attorney, Agent, or Firm—Flehr, Hohbach, Test, Albritton & Herbert

[57] ABSTRACT

A memory module, parity bit emulator, and method which emulate storing and retrieving a parity bit from memory. The memory module includes a memory for storing a data word which is retrieved from the memory during the read cycle. The memory module also includes a parity bit emulator which includes a parity bit generator. The parity bit generator is responsive to the retrieved data word and generates in response a corresponding parity bit during the read cycle. The memory module also includes an input/output port for outputting the retrieved data word and the generated parity bit during the read cycle.

21 Claims, 3 Drawing Sheets

MEMORY MODULE, PARITY BIT EMULATOR, AND ASSOCIATED METHOD FOR PARITY BIT EMULATION

FIELD OF THE INVENTION

The present invention relates generally to memory modules. In particular, it pertains to a memory module which emulates storing and retrieving a parity bit from memory.

BACKGROUND OF THE INVENTION

In many computer systems, the main memory controller generates a parity bit during a write cycle. This parity bit corresponds to a data word which is to be stored in the main memory of the system. The parity bit will indicate either that the data word has an even or odd number of bits with the value of "1". The parity bit and the data word are both provided to the main memory.

Conventional memory modules used for the main memory store both the data word and the parity bit. When the CPU requests that the data word be retrieved from memory, the memory module outputs both the stored data word and the stored parity bit.

In response to receiving the retrieved data word, the memory controller generates another parity bit and compares this parity bit with the original parity bit retrieved from memory. If the two parity bits do not match, the retrieved data word is different from the originally generated data word. This indicates that the retrieved data word was corrupted during storage or transmission. The system will then shut down and require the user to reset it.

One problem associated with these conventional memory modules is that they are no longer cost effective. Recent advances in the electronics industry have made memory products extremely reliable. As a result, differences in the compared parity bits occur very seldom. Thus, the advantage obtained from having additional memory in the memory module for storing the parity bits is no longer outweighed by the high cost of the additional memory.

Another problem associated with this approach is that the parity bits only indicate whether a data word has an even or an odd number of bits with the value "1". Thus, the retrieved data word can have two bits different than the originally generated data word but the compared parity bits will be the same. This effectively renders the additional memory for storing the parity bits useless. Thus, it makes it desirable to eliminate or bypass the addition of such memory.

OBJECTS OF THE INVENTION

It is therefore an object of the invention to provide a cost effective memory module and associated method for storing and retrieving a data word.

It is another object of the invention to provide a memory module, parity bit emulator, and associated method which eliminate the need for additional memory for storing parity bits.

SUMMARY OF THE INVENTION

The foregoing and other objects of the invention are achieved by a memory module, parity bit emulator, and method which emulate storing and retrieving a parity bit from memory. The memory module includes a memory for storing a data word which is retrieved from the memory during the read cycle. The memory module also includes a parity bit emulator which includes a parity bit generator. The parity bit generator is responsive to the retrieved data word and generates in response a corresponding parity bit during the read cycle. The memory module also includes an input/output port for outputting the retrieved data word and the generated parity bit during the read cycle.

BRIEF DESCRIPTION OF THE DRAWINGS

The foregoing and other objects of the invention will be more clearly understood from the following detailed description and appended claims when read in connection with the following drawings, in which:

DETAILED DESCRIPTION OF THE INVENTION

Figure 1:
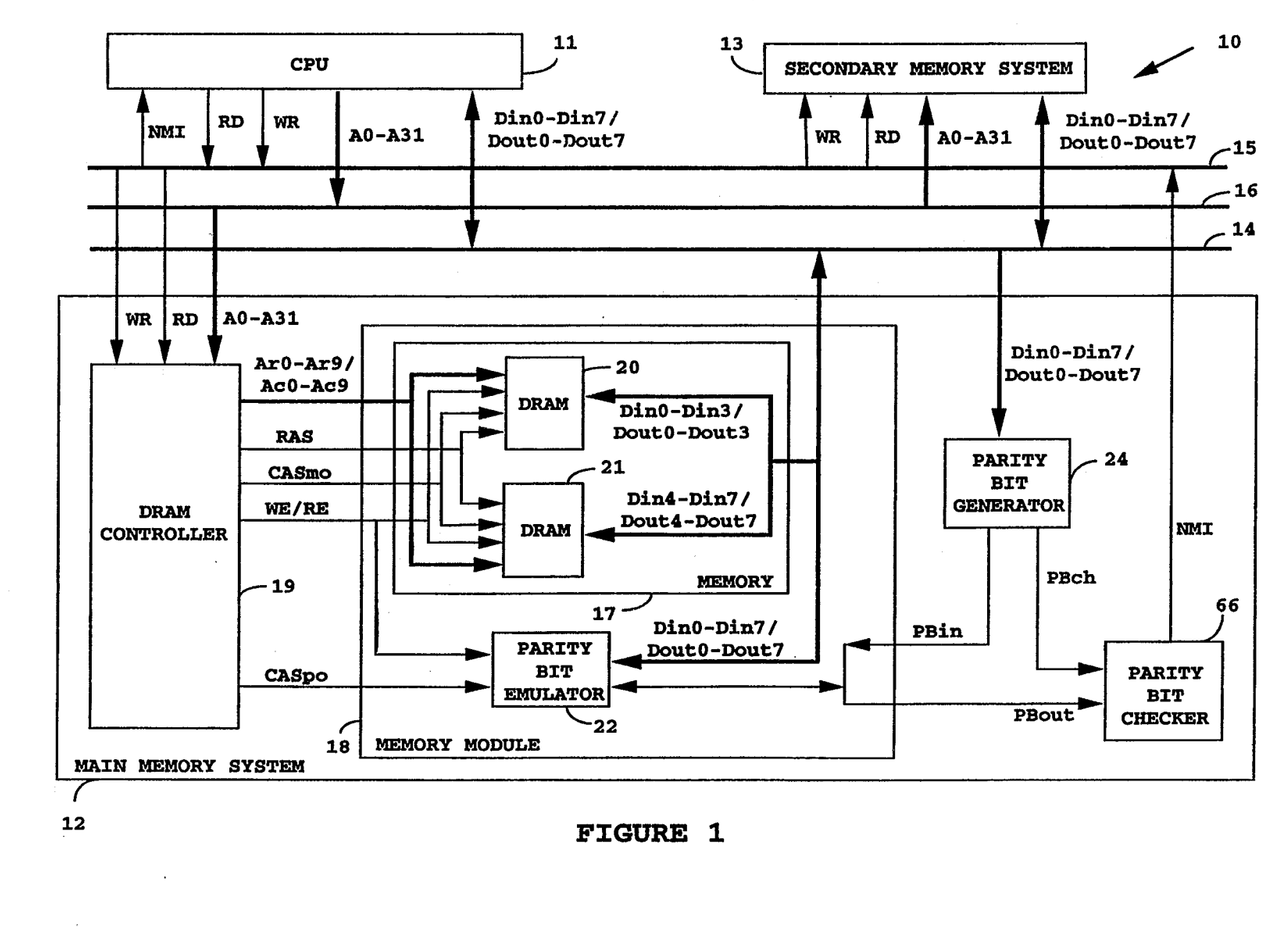
FIG. 1 is a block diagram of a computer system including a memory module in accordance with the invention.
Figure 2:
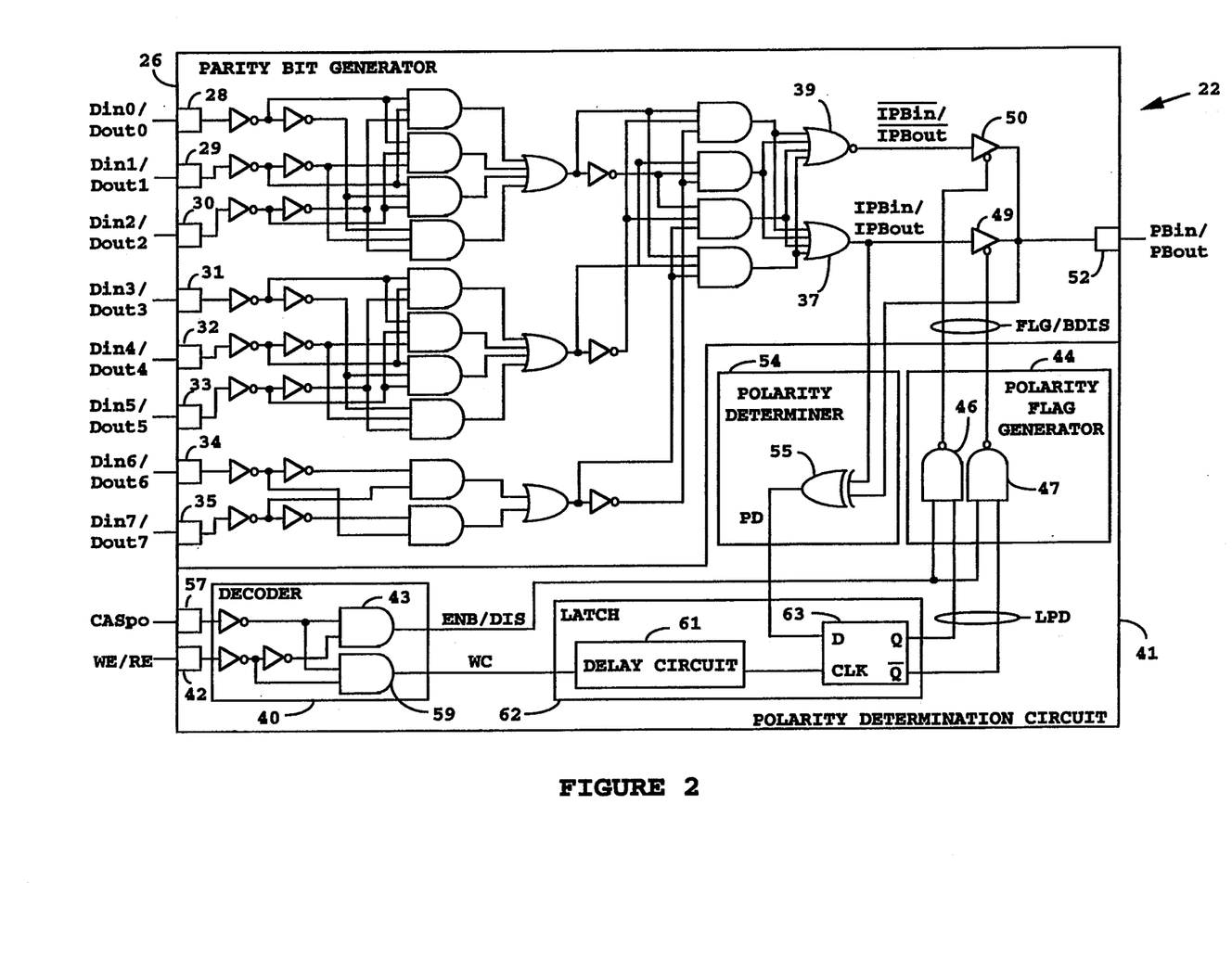
FIG. 2 shows a detailed description of the parity bit emulator of the memory module.
Figure 3:
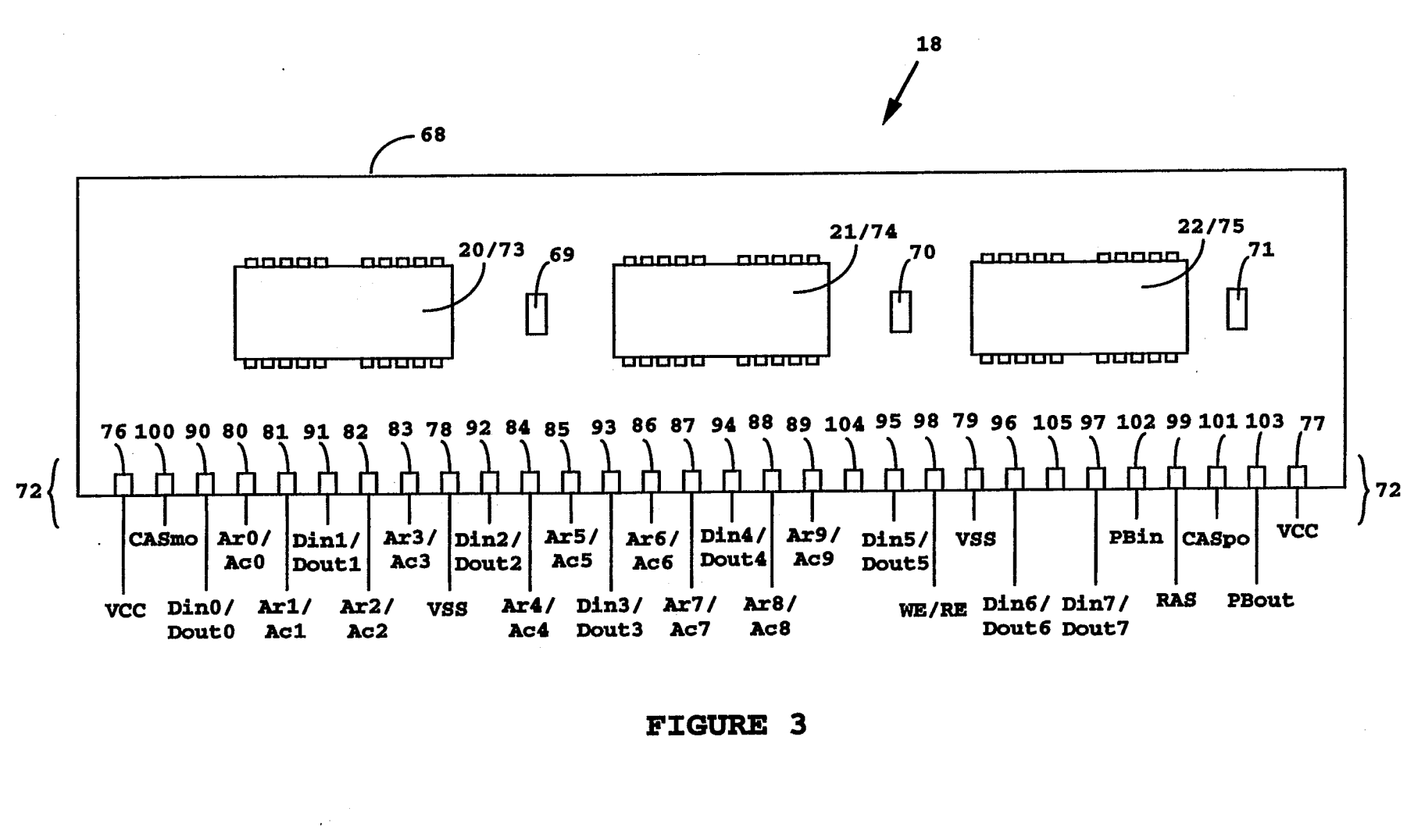
FIG. 3 shows the preferred embodiment of the memory module of FIG. 2.

FIGS. 1-3 provide illustrations of the invention disclosed herein. In these figures, like components are designated by like numerals.

Referring initially to FIG. 1, there is shown a block diagram of a computer system 10. The computer system 10 includes a central processing unit (CPU) 11, a main memory system 12, a secondary memory system, 13, a data bus 14, an address bus 15, and a control bus 16.

During a write cycle, an eight bit data word (Din0-Din7) is stored in the memory 17 of the memory module 18. At the beginning of a write cycle, the CPU 11 generates a write signal (WR) and a thirty two bit address (A0-A31). The write signal (WR) is outputted on the control bus 16 while the address (A0-A31) is outputted on the address bus 15.

In response to receiving the write signal (WR) and the address (A0-A31), the dynamic-random-access memory (DRAM) controller 19 of the main memory system 12 generates a set of write cycle control signals and address signals. These signals are necessary to store the first four bits (Din0-Din3) and the second four bits (Din4-Din7) of the data word respectively in the DRAMs 20 and 21 which form the memory 17 of the memory module 18.

The control signals include a write enable signal (WE), a row address strobe (RAS), a column address strobe for memory operation (CASmo), and a column address strobe for parity operation (CASpo). Each of these signals is provided to the DRAMs 20 and 21 and each is represented by a "0" bit. The write enable signal (WE) is used to enable the DRAMs 20 and 21 for storing the first four bits (Din0-Din3) and the second four bits (Din4-Din7) respectively of the input data word. The row address strobe (RAS) is used to enable the DRAMs 20 and 21 for receiving a row address. Similarly, the column address strobe for memory operation (CASmo) is used to enable the DRAMs 20 and 21 for receiving a column address. The column address strobe for parity operation (CASpo) is used for independent parity bit operation by the parity bit emulator 22 of the memory module 18.

The addresses include a ten bit row address (Ar0-Ar9) and a ten bit column address (Ac0-Ac9). These addresses are multiplexed to the DRAMs 20 and 21 at different times. The row address (Ar0–Ar9) is outputted prior to the column address (Ac0–Ac9). Thus, the row address strobe (RAS) is provided to the DRAMs 20 and 21 before the two column address strobes (CASmo and CASpo).

The data word (Din0–Din7) is either generated by the CPU 11 during operation or is an instruction provided by the secondary memory system 13. It is outputted onto the data bus 14.

In response to receiving the input data word (Din-0–Din7), the parity bit generator 24 of the main memory system 12 generates a corresponding input parity bit (PBin) associated with the input data word (Din-0–Din7). The parity bit (PBin) is then provided to the parity bit emulator 22. The input parity bit (PBin) will indicate either that the input data word has an even number of "1" bits (i.e. even parity) or that the input data word has an odd number of "1" bits (i.e. odd parity).

However, depending on the type of parity bit generator or memory controller used, this parity bit will have either an inverted or non-inverted polarity (i.e. even or odd parity bit value format). Thus, if the input parity bit (PBin) is outputted having a non-inverted or true polarity, it will be represented by a "1" bit if the data word has even parity and will be represented by a "0" bit if the data word has odd parity. However, if the input parity bit (PBin) is outputted having an inverted polarity, it will be represented by a "0" bit if the input data word has even parity and will be represented by a "1" bit if the input data word has odd parity.

When the DRAMs 20 and 21 receive the write enable signal (WE) and the row address strobe (RAS), they store in their internal address buffers the multiplexed row address (Ar0–Ar9). Then, when they receive the write enable signal (WE) and the later multiplexed column address strobe for memory operation (CASmo), they store in their internal column address buffers the column address (Ac0–Ac9). After the row and column addresses (Ar0–Ar9 and Ac0–Ac9) have been properly stored in the internal address buffers, the first four bits (Din0–Din3) and the second four bits (Din4–Din7) of the input data word are respectively stored in the DRAMs 20 and 21 at locations corresponding to these addresses.

Referring to FIG. 2, while the DRAMs 20 and 21 of the memory 17 are storing the input data word (Din-0–Din7), the parity bit emulator 22 of the memory module 18 is in operation. The parity bit generator 26 of the parity bit emulator 22 receives from the CPU bus 14 the input data word (Din0–Din7) at the input terminals 28–35. In response, an intermediate parity bit having a non-inverted polarity (IPBin) is generated at the output of the OR gate 37 and an intermediate parity bit having an inverted polarity ($\overline{IPBin}$) is generated at the output of the NOR gate 39. As is the case with the input parity bit (PBin), the intermediate parity bits (IPBin and $\overline{IPBin}$) indicate whether or not the received data word has an odd number or even number of "1" bits. Furthermore, these intermediate parity bits are represented in the way described earlier for the possible polarities of the input parity bit (PBin).

During this time, the read/write decoder 40 of the polarity determination circuit 41 receives the write enable signal (WE) at the input terminal 42 of the parity bit emulator 22. Since this signal is represented as a "0" bit, the output of the AND gate 43 of the decoder 40 provides a disable signal (DIS) represented as a "0" bit. The disable signal (DIS) is used for disabling the polarity (i.e. parity format) flag generator 44 of the polarity (i.e. parity format) determination circuit 41. In response, the outputs of the NAND gates 46 and 47 of the polarity flag generator 44 together provide a two bit buffer disable signal (BDIS) represented by two "1" bits. This two bit signal is used for disabling both of the buffers 49 and 50 of the parity bit generator 26 during a write cycle. Thus, neither of the intermediate parity bits (IPBin and $\overline{IPBin}$) are provided at the input/output terminal 52 of the parity bit generator 26 during a write cycle.

When the buffers 49 and 50 are disabled from outputting the two intermediate parity bits (IPBin and $\overline{IPBin}$), the input/output terminal 52 receives the input parity bit (PBin). The input parity bit (PBin) together with the non-inverted intermediate parity bit (IPBin) are provided to the polarity (i.e. parity format) determiner 54 of the polarity determination circuit 41. The polarity determiner 54 comprises an XOR gate 55. The XOR gate 55 compares the two received parity bits (PBin and IPBin) and provides at its output a polarity (i.e. parity format) determined signal (PD).

Since these two parity bits correspond to the same input data word (Din0–Din7), the polarity determined signal (PD) simply identifies the polarity of the input parity bit (PBin). If the input parity bit (PBin) and the non-inverted intermediate parity bit (IPBin) are the same, then the input parity bit (PBin) has a non-inverted polarity. As a result, the polarity determined signal (PD) indicates this when it is represented as a "0" bit. However, if the input parity bit (PBin) and the non-inverted intermediate parity bit (IPBin) are different, then the input parity bit (PBin) has an inverted polarity. The polarity determined signal (PD) indicates this when it is represented as a "1" bit.

The read/write decoder 40 of the polarity determination circuit 41 receives at the input terminal 57 the column address strobe for parity operation (CASpo) during the time that it also receives the write enable signal (WE). Since this column address strobe (CASpo) is also represented as a "0" bit, the output of the AND gate 59 of the decoder 40 provides a write clock signal (WC) represented as a "1" bit.

The write clock signal (WC) is received by the delay circuit 61 of the latch 62. The delay circuit applies an approximate twenty nanosecond delay to the write clock signal (WC). This delay provides sufficient time for the polarity determined signal (PD) to be received at the CLK input of the D flip flop 63 prior to the delayed write clock signal (WC) being received by the D flip-flop 63 at the D input.

In response to receiving the delayed write clock signal (WC), the D flip-flop 63 latches the polarity determined signal (PD). As a result, the D flip-flop 63 outputs the latched polarity determined signal (LPD) as a two bit signal. The first bit is provided at the Q output while the second is provided at the $\overline{Q}$ output.

As was indicated earlier, if the polarity determined signal (PD) is a "0" bit, then the input parity bit (PBin) has a non-inverted polarity. As a result, the first bit of the latched polarity determined signal (LPD) will be latched as a "0" bit while the second bit of the signal will be latched as a "1" bit.

However, if the polarity determined signal (PD) is a "1" bit, then the input parity bit has an inverted polarity. As a result, the first bit of the latched polarity determined signal (LPD) will be a "1" bit while the second bit of the signal will be a "0" bit.

The polarity flag generator 44 receives the latched polarity determined signal (LPD). However, as discussed earlier, it only outputs the two bit buffer disable signal (BDIS) for disabling the buffers 49 and 50 while the write enable signal (WE) continues to be received by the decoder 40.

With conventional memory modules, the write cycle is completed when both the data word and the corresponding parity bit are both stored in memory. However, with memory module 18, the write cycle is completed once the data word (Din0-Din7) is stored in the DRAMs 20 and 21 and the polarity determined signal (PD) has been latched by the latch 63.

Referring back to FIG. 1, during a read cycle, an output data word (Dout0-Dout7) is retrieved from the memory 17 of the memory module 18. The output data word (Dout0-Dout7) can be the input data word (Din0-Din7) just stored or a previously stored data word.

At the beginning of the read cycle, the CPU 11 generates a read signal (RD) and a read address (A0-A31). Like the write signal (WR), the read signal (RD) is outputted by the CPU 11 on the data bus 14 and received by the DRAM controller 19.

In response to the read signal (RD), the DRAM controller 19 generates read cycle control signals and address signals. These signals are necessary to retrieve the first four bits (Dout0-Dout3) and the second four bits (Dout4-Dout7) of the output data word from the DRAMs 20 and 21 respectively.

The read cycle control signals include a read enable signal (RE), the earlier described row address strobe (RAS), and the two earlier described column address strobes (CASmo and CASpo). The read enable signal (RE) is the inverse of the write enable signal (WE) and is provided on the same line as is the write enable signal (WE). Thus, while the write enable signal (WE) and the row and column address strobes (RAS, CASmo, and CASpo) are each represented by a "0" bit, the read enable signal (RE) is represented by a "1" bit. It is used to enable the DRAMs 20 and 21 for retrieval of the first four bits (Dout0-Dout3) and the second four bits (Dout4-Dout7) of the output data word from the DRAMs 20 and 21 respectively.

As was the case during the write cycle, when the DRAMs 20 and 21 receive the read enable signal (RE) and the row address strobe (RAS), they store in their internal address buffers the multiplexed row address (Ar0-Ar9). Then, when they receive the read enable signal (RE) and the column address strobe for memory operation (CASmo), they store in their internal column address buffers the later multiplexed column address (Ac0-Ac9). When both the row and column addresses (Ar0-Ar9 and Ac0-Ac9) have been properly stored in the internal address buffers, the first four bits (Dout0-Dout3) and the second four bits (Dout3-Dout7) of the output data word are retrieved from the DRAMs 20 and 21 respectively at the locations corresponding to these addresses.

Referring back to FIG. 2, the parity bit generator 26 of the parity bit emulator 22 receives the retrieved data word (Dout0-Dout7) at the input terminals 28-35. In response, an intermediate parity bit having a non-inverted polarity (IPBout) is generated at the output of the OR gate 37 and an intermediate parity bit having an inverted polarity ($\overline{\text{IPBout}}$) is generated at the output of the NOR gate 39. The intermediate parity bits (IPBout and $\overline{\text{IPBout}}$) provide the same information and are represented in the same way as was described earlier for the intermediate parity bits (IPBin and $\overline{\text{IPBin}}$) generated during the write cycle.

During this time, the read/write decoder 40 receives at the input terminal 42 the read enable signal (RE) represented as a "1" bit and receives at the input terminal 57 the column address strobe for parity operation (CASpo) represented as a "0" bit. As a result, the output of the AND gate 43 of the decoder 40 provides an enable signal (ENB) represented as a "1" bit. The enable signal (ENB) is used for enabling the polarity flag generator 44 of the polarity determination circuit 41.

During the read cycle, the latch 62 continues to latch the polarity determined signal (PD). Thus, the polarity flag generator 44 continues to receive the latched two bit polarity determined signal (LPD).

When the polarity flag generator 44 has been enabled by the enable signal (ENB), the polarity flag generator 44 provides a two bit polarity (i.e. parity format) flag (FLG) to the parity bit generator 26. This signal identifies the polarity of the input parity bit (PBin) which was received during the described write cycle. The first bit of the polarity flag (FLG) is provided at the output of the NAND gate 46. The second bit of the polarity flag (FLG) is provided at the output of the NAND gate 47.

As was indicated earlier, if the input parity bit (PBin) has a non-inverted polarity, the first bit of the latched polarity determined signal (LPD) will be a "0" bit while the second bit of that signal will be a "1" bit. As a result, the first bit of the polarity flag (FLG) will be a "1" and the second bit will be a "0". This will disable the buffer 49 while enabling the buffer 50. The enabled buffer 50 will then provide to the input/output terminal 52 the intermediate parity bit (IPBout) supplied by the output of the OR gate 37.

However, if the input parity bit (PBin) has an inverted polarity, the first bit of the latched polarity determined signal (LPD) will be a "1" bit while the second bit of that signal will be a "0" bit. As a result, the first bit of the polarity flag (FLG) will be a "0" and the second bit will be a "1". This will disable the buffer 50 while enabling the buffer 49. The enabled buffer 50 will then provide the input/output terminal 52 with the intermediate parity bit ($\overline{\text{IPBout}}$) supplied by the output of the OR gate 39.

Thus, during a read cycle, the parity generator 26 receives the polarity flag (FLG). In response, the parity bit generator 26 outputs whichever of the intermediate parity bits (IPBout and $\overline{\text{IPBout}}$) has the polarity identified by the polarity flag (FLG). Referring back to FIG. 1, the output parity bit (PBout) is provided to the parity bit checker 66 of the main memory system 12.

The retrieved data word (Dout0-Dout7) is also outputted onto the data bus 14. From there it is received by either the CPU 11 or the secondary memory system 13 and is also received by the parity bit generator 24 of the main memory system 12. In response, the parity bit generator 24 generates a corresponding parity bit (PBch) for parity checking purposes and provides it to the parity bit checker 66.

The parity bit checker 66 compares the output parity bit (PBout) provided by the parity bit emulator 22 with the checking parity bit (PBch) provided by the parity bit generator 24. If these parity bits do not match, the parity bit checker 66 generates a non-maskable interrupt (NMI) which is outputted onto the control bus 16. In response, the CPU 11 will shut down the computer system 10 thereby necessitating a reset.

However, the inclusion of the parity bit emulator 22 in the memory module 18 ensures that the output parity bit (PBout) and the checking parity bit (PBch) are both generated from the retrieved data word (Dout-0–Dout7). As a result, these two parity bits will be the same. Thus, it is extremely unlikely that a non-maskable interrupt (NMI) will occur. The read cycle is completed when the data word has been retrieved and the output parity bit (PBout) has been compared with the checking parity bit (PBch).

As is evident from the foregoing discussion, the parity emulator 22 emulates storing and retrieving a parity bit from memory. Since the need for additional memory for storing and retrieving a parity bit has been bypassed, the memory module 16 is much less costly than prior art memory modules.

Furthermore, the polarity determination circuit 41 uses a self learning process to determine the polarity of the input parity bit received during the last write cycle. As a result, the memory module 18 may be used with either a memory controller which generates an input parity bit (PBin) having a non-inverted polarity or a memory controller which generates an input parity bit (PBin) with an inverted polarity. Furthermore, the self learning feature of the parity bit emulator 22 will allow it to adapt to any alterations of the computer system 10 which result in a change in the polarity of the input parity bit (PBin).

FIG. 3 provides an illustration of the preferred implementation of the memory module 18 and the parity bit emulator 22. The parity bit emulator 22 and the DRAMs 20 and 21 are implemented as separate chips and are mounted on a printed circuit board substrate 68. Also mounted on the printed circuit board 68 are the capacitors 69–71 and the input/output port 72 of the memory module 18.

The DRAM chips 20 and 21 are each a conventional 1M ×4 bit DRAM chip. In other words, each has the capacity to store 1 megabyte of information with each byte being 4 bits. Thus, the DRAM chip 20 stores the first four bits (Din0–Din3 and Dout0–Dout3) of the input and output data words while the DRAM chip 21 stores the second four bits (Din4–Din7 and Dout-4–Dout7) of the input and output data words. Furthermore, the DRAM chips 20 and 21 are respectively packaged in the single chip carriers 73 and 74. The chip carriers 73 and 74 respectively mount the DRAM chips 20 and 21 to the printed circuit board 68.

The parity bit emulator chip 22 is implemented with conventional electronic design automation (EDA) techniques. Like the DRAMchips 20 and 21, the parity bit emulator chip 22 is also packaged in a single chip carrier 75. The chip carrier 75 mounts the parity bit emulator chip 22 to the printed circuit board 68.

The capacitors 69–71 are connected between the power supply pins and ground pins of the chips 20, 21, and 22 respectively in order to eliminate transient spikes in the power supply voltage. They each have a value of approximately between 0.1 to 1 microfarad and can be formed of a ceramic material or tantalum.

The printed circuit board 68 is configured similar to a standard single-in-line-memory-module (SIMM) circuit board and is adapted for being mounted in a conventional SIMM connector. Thus, the 30 terminals 76–105 of the input/output port 75 are configured to be compatible with a conventional SIMM connector. FIG. 3 provides the electrical connections made when the printed circuit board 68 is mounted in such a connector.

Specifically, the terminals 76 and 77 provide the chips 19, 20, and 22 with the power supply voltage (VCC). The terminals 78 and 79 provide these chips with the ground voltage (VSS).

The terminals 80–89 provide the DRAM chips 20 and 21 with the multiplexed bits Ar0–Ar9 of the row address. These terminals also provide the DRAM chips with the later multiplexed bits Ac0–Ac9 of the column address.

The terminals 90–97 provide the parity bit emulator chip 22 with the bits Din0–Din7 of the input data word. The terminals 90–93 provide the DRAMchip 20 with the first four bits Din0–Din3 of the input data word and also output the first four bits Dout0–Dout3 of the output data word retrieved from the DRAMchip 20. The terminals 94–97 provide the DRAMchip 21 with the second four bits Din4–Din7 of the input data word and also output the second four bits Dout4–Dout7 of the output data word retrieved from the DRAM chip 21.

The terminal 98 provides the chips 19, 20, and 22 with the write enable signal (WE) and the inverse read enable signal (RE). The terminals 99 and 100 provide the DRAMchips 20 and 21 with the row address strobe (RAS) and the column address strobe for memory operation (CASmo). The terminal 101 provides the parity bit emulator chip 22 with the column address strobe for parity operation (CASpo).

The terminal 102 provides the parity bit emulator 22 with the input parity bit (PBin). And, the terminal 103 outputs the output parity bit (PBout) generated by the parity bit emulator 22.

The FIGS. 1–3 and the foregoing discussion illustrate the preferred embodiment of the invention. However, numerous alternative embodiments exist.

Memory module 18 and parity bit emulator 22 have been described earlier in the context of an eight bit data word and a corresponding single parity bit. However, one skilled in the art will appreciate that memory module 18 and parity bit emulator 22 can be implemented for use with a data word of any bit size and with corresponding multiple parity bits.

In particular, memory module 18 and parity bit emulator 22 can be easily adapted for use with a data word having a multiple of eight bits and with a corresponding parity bit for every eight bits of the data word. For example, memory module 18 can be configured to receive and output a sixteen bit data word and a parity bit which corresponds to the first eight bits of the data word and a second parity bit which corresponds to the second eight bits of the data word. In such a case, memory 17 can be conventionally configured for storage and retrieval of a sixteen bit data word. Furthermore, parity bit emulator 22 can be configured to have two parallel parity bit generators 26.

During a write cycle, the first of the parity bit generators 26 will receive the first eight bits of the data word and a parity bit corresponding to these eight bits while the second of the parity bit generators 26 receives the second eight bits and a parity bit corresponding to these eight bits. Then, during a read cycle, the first of the parity bit generators 26 will receive the first eight bits of the retrieved data word and generate a parity bit corresponding to these eight bits while the second of the parity bit generators 26 receives the second eight bits of the retrieved data word and generates a parity bit corresponding to these eight bits. One skilled in the art will appreciate that a similar configuration can be implemented for use with data words of other multiples of eight bits and with a corresponding parity bit for every eight bits of the data word.

The earlier mentioned memory module 18 and parity bit emulator 22 were also described in operation with a memory 17 formed by the pair of DRAMs 20 and 21. However, for storing the input and output data words (Din0–Din7 and Dout0–Dout7), the memory 17 can also be formed by a single DRAM or more than two DRAMs. For example, eight parallel 4M×1 bit DRAMs can be used. In other words, each DRAM can store 4 megabytes of information with each byte being 1 bit. In this case, each of the eight DRAMs stores one of the bits (Din0–Din7) of the input data word and one of the bits (Dout0–Dout7) of the output data word. Moreover, an array of memory modules 18 can be used to increase the storage capacity of the main memory system 12. And, the type of memory used need not be limited to a DRAM. Instead, a static-random-access memory (SRAM) or a Flash memory can also be used.

Furthermore, the earlier described memory module 18 need not be limited to the separately packaged chips 20, 21, and 22 which are disposed on the printed circuit board 68. Using conventional techniques, the unpackaged chips 20, 21, and 22 may instead be mounted together on a substrate to implement the memory module 18 as a hybrid integrated circuit. The substrate used can be a printed circuit board or a ceramic material. This hybrid memory module circuit 19 may then be packaged in a single multi-chip carrier. The unpackaged chips 20, 21, and 22 may also be mounted on a semiconductor substrate along with other circuit elements formed on the substrate in order to implement a large scale integrated circuit.

Additionally, as was described earlier, the polarity determination circuit 41 of the parity bit emulator 22 utilizes a self learning process for determining the unknown polarity of the input parity bit (PBin). However, if the polarity of the input parity bit (PBin) is determined beforehand, then the parity bit emulator 22 can be hardwired to bypass this self learning process so that the output parity bit (PBout) is generated having the known polarity. As a variation of this, the parity bit emulator 22 can simply consist of a parity bit generator which outputs the parity bit (PBout) with the known polarity.

Lastly, some memory controllers may output additional control signals or additional address bits for storing and retrieving the data word from memory. In this case, the additional terminals 104 and 105 in FIG. 3 may be used to provide these control signals to the proper elements of the memory module 18.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A memory module comprising:
an input/output port for receiving during a first write cycle a first data word and for receiving during a second write cycle a second data word and an input parity bit for said second data word having an undetermined parity format;
a memory coupled to said input/output port in which said received first data word is stored during said first write cycle and from which said stored first data word is retrieved during a read cycle;
parity format determining circuitry coupled to said input/output port and responsive to said received second data word and to said received input parity bit for determining said parity format of said received input parity bit and generating a corresponding parity format flag identifying said determined parity format; and
a parity bit generator coupled to said memory and responsive to said retrieved first data word and said parity format flag for generating during said read cycle an output parity bit for said retrieved first data word having said determined parity format;
wherein said input/output port is also coupled to said parity bit generator for providing during said read cycle said retrieved first data word and said generated output parity bit.

2. The memory module of claim 1 wherein said first data word is represented by a multiple of eight data bits.

3. The memory module of claim 1 further comprising a printed circuit board, a circuit chip mounted on said printed circuit board including said parity bit generator and said parity format determining circuitry, and at least one memory chip mounted on said printed circuit board including said memory.

4. The memory module of claim 3 wherein said printed circuit board and said input/output port are configured so that said printed circuit board can be mounted in a connector attached to a mother circuit board.

5. The memory module of claim 1 wherein:
said parity bit generator includes intermediate parity bit generating circuitry responsive during said second write cycle to said received second data word for generating an intermediate parity bit for said second data word having a predetermined parity format;
said parity format determining circuitry includes:
said intermediate parity bit generating circuitry; and
a parity format determination circuit, responsive to said received input parity bit and to said generated intermediate parity bit, for determining said parity format of said received input parity bit and for generating said parity format flag.

6. The memory module of claim 5 further comprising:
a read input terminal for receiving a read signal during said read cycle;
wherein said parity format determination circuit includes:
a parity format determiner, responsive to said received input parity bit and to said generated intermediate parity bit, for determining said parity format of said received input parity bit and generating in response a parity format determined signal;
a storage element for storing said generated parity format determined signal;
a decoder responsive to said received read signal for generating an enable signal during said read cycle; and
a parity format flag generator, responsive to said stored parity format determined signal and to said generated enable signal, for generating said parity format flag during said read cycle.

7. A method of storing and retrieving data and emulating parity bit storage and retrieval, said method comprising the steps of:
- receiving during a first write cycle a first data word at an input/output port;
- receiving during a second write cycle a second data word and input parity bit having an undetermined parity format at said input/output port;
- storing said received first data word during said first write cycle;
- determining said parity format of said input parity bit in response to said second data word and said input parity bit;
- generating a parity format flag identifying said determined parity format;
- retrieving during a read cycle said stored first data word;
- generating an output parity bit during said read cycle for said retrieval first data word in response to said parity format flag; and
- providing during said read cycle said retrieved first data word and said generated output parity bit at said input/output port.

8. The method of claim 7 wherein said step of determining said parity format includes the steps of:
- generating an intermediate parity bit for said received second data word having a predetermined parity format in response to said second data word; and
- determining said parity format of said input parity bit in response to said generated intermediate parity bit and said received input parity bit.

9. The method of claim 7 further comprising the step of storing said received second data word during said second write cycle without storing said input parity bit.

10. A parity bit storage and retrieval emulator for use with a storage device, said emulator comprising:
- a data input for receiving during a write cycle a first data word to be stored in said storage device and for receiving during a read cycle a second data word retrieved from said storage device;
- a parity bit input for receiving during said write cycle an input parity bit for said first data word having an undetermined parity format;
- parity format determining circuitry response to said received first data word and to said received input parity bit for determining said parity format of said received input parity bit and for generating a parity format flag identifying said determined parity format;
- a parity bit generator responsive to said generated parity format flag and to said retrieved second data word for generating during said read cycle an output parity bit for said second data word having said determined parity format.

11. The emulator of claim 10 further comprising a circuit chip including said parity bit generator and said parity format determining circuitry.

12. The emulator of claim 10 wherein:
- said parity bit generator includes intermediate parity bit generating circuitry responsive during said first write cycle to said received first data word for generating an intermediate parity bit for said first data word having a predetermined parity format;
- said parity format determining circuitry includes;
  - said intermediate parity bit generating circuitry; and
  - a parity format determination circuit, responsive to said received input parity bit and to said generated intermediate parity bit, for determining said parity format of said received input parity bit and for generating said parity format flag.

13. The emulator of claim 12 further comprising:
- a read input for receiving a read signal during said read cycle;
- wherein said parity format determination circuit includes:
  - a parity format determiner, responsive to said received input parity bit and to said generated intermediate parity bit, for determining said parity format of said received input parity bit and generating in response a parity format determined signal;
  - a storage element for storing said generated parity format determined signal;
  - a decoder for generating an enable signal in response to said received read signal; and
  - a parity format flag generator, responsive to said stored parity format determined signal and to said generated enable signal, for generating said parity format flag during said read cycle.

14. A method of emulating parity bit storage and retrieval for use with a storage device, said method comprising the steps of:
- receiving during a write cycle a first data word to be stored in said storage device;
- receiving during said write cycle an input parity bit for said first data word having an undetermined parity format;
- determining said parity format of said input parity bit in response to said first data word and said input parity bit; and
- generating a parity format flag identifying said determined parity format;
- receiving during a read cycle a second data word retrieved from said storage device;
- generating during said read cycle an output parity bit for said retrieved second data word having said determined parity format in response to said parity format flag.

15. The method of claim 14 wherein said step of determining said parity format includes the step of:
- generating during said write cycle an intermediate parity bit for said first data word having a predetermined parity format; and
- determining said parity format of said input parity bit in response to said generated intermediate parity bit and said received input parity bit.

16. The method of claim 14 wherein said receiving, determining, and generating steps are performed without storing said input parity bit.

17. A parity checking system for use with a storage device comprising:
- parity bit generating circuitry responsive to a first data word to be stored in said storage device during a write cycle for generating during said write cycle an input parity bit for said first data word;
- a parity bit storage and retrieval emulator coupled to said parity bit generating circuitry including:
  - parity format determining circuitry responsive to said received first data word and to said input parity bit for determining said parity format of said input parity bit and for generating a parity format flag identifying said determined parity format; and
  - a parity bit generator responsive during a read cycle to a second data word retrieved from said storage device and to said parity format flag for generating during said read cycle an output parity bit for said second data word having said determined parity format; and parity checking circuitry coupled to said parity bit storage and retrieval emulator and responsive to said retrieved second data word and to said generated output parity bit for conducting parity checking of said second data word.

18. The parity checking system of claim 17 wherein:

said parity bit generator includes intermediate parity bit generating circuitry responsive during said first write cycle to said received first data word for generating an intermediate parity bit for said first data word having a predetermined parity format;

said parity format determining circuitry includes:

said intermediate parity bit generating circuitry; and a parity format determination circuit, responsive to said received input parity bit and to said generated intermediate parity bit, for determining said parity format of said received input parity bit and for generating said parity format flag.

19. A parity checking method for use with a storage device comprising the steps of:

receiving a first data word to be stored in said storage device during a write cycle;

generating during said write cycle an input parity bit for said received first data word;

determining said parity format of said input parity bit in response to said received first data word and to said input parity bit;

generating a parity format flag identifying said determined parity format;

receiving a second data word retrieved from said storage device during a read cycle;

generating during said read cycle an output parity bit for said received second data word having said determined parity format in response to said parity format flag; and conducting parity checking of said received second data word in response to said received second data word and said generated output parity bit.

20. The method of claim 19 wherein said step of determining said parity format includes the step of:

generating during said write cycle an intermediate parity bit for said first data word having a predetermined parity format; and determining said parity format of said input parity bit in response to said generated intermediate parity bit and said received input parity bit.

21. The method of claim 19 wherein said receiving, determining, generating, and conducting steps are performed without storing said input parity bit.

* * * * *